United States Patent [19]

Smith

[11] Patent Number: 4,965,920
[45] Date of Patent: Oct. 30, 1990

[54] FLUID HEATED ROLL APPARATUS AND METHOD

[75] Inventor: Sanford N. Smith, Spartanburg, S.C.

[73] Assignee: Phillips Petroleum Company, Bartlesville, Okla.

[21] Appl. No.: 377,505

[22] Filed: Jul. 7, 1989

[51] Int. Cl.$^5$ .................... B21B 1/08; B21B 27/02; B21B 31/08
[52] U.S. Cl. ........................... 29/112; 34/124; 34/125; 38/44; 165/40; 165/90; 285/190
[58] Field of Search ............... 285/190; 29/110, 112; 100/93 RP; 34/119, 124, 125; 165/40, 90; 38/44; 236/19

[56] References Cited

U.S. PATENT DOCUMENTS

| 1,107,737 | 8/1914 | Witham et al. | 241/33 |
| 2,161,950 | 6/1939 | Christensen | 91/18 |
| 2,362,947 | 11/1944 | Sullivan | 38/49 |
| 3,451,331 | 6/1969 | Frederickson et al. | 100/93 |
| 3,691,840 | 9/1972 | Dufour et al. | 73/349 |
| 4,081,229 | 3/1978 | Moore | 425/144 |
| 4,082,101 | 4/1978 | Hazelett et al. | 134/127 |
| 4,089,121 | 5/1978 | Sawyer | 34/16 |
| 4,205,457 | 6/1980 | Sjöstrand | 34/43 |
| 4,274,273 | 6/1981 | Fapiano et al. | 72/13 |
| 4,343,860 | 8/1982 | Fernstrom et al. | 428/371 |
| 4,354,183 | 10/1982 | Weeks et al. | 340/682 |
| 4,374,797 | 2/1983 | Koschinek et al. | 264/210.3 |
| 4,562,655 | 1/1986 | Bosshart et al. | 38/52 |
| 4,677,773 | 7/1987 | Kamberg | 38/44 |
| 4,734,229 | 3/1988 | Johnson et al. | 264/40.6 |

OTHER PUBLICATIONS

Rotary Pressure Joints, Bulletin No-C13-1002, Johnson Corporation, 1982, pp. 1-24.

Primary Examiner—Timothy V. Eley
Assistant Examiner—S. Thomas Hughes
Attorney, Agent, or Firm—William R. Sharp

[57] ABSTRACT

An apparatus and method are provided wherein a cavity defined by a rotating hollow member, such as a draw roll in a fiber processing system, is supplied with a hot fluid so as to heat the exterior surface of the hollow member. The fluid is withdrawn from the cavity and passed through a rotating syphon conduit which is fixedly connected to the hollow member. The temperature of fluid flowing within the syphon conduit is detected by a suitable temperature detector positioned within the syphon conduit so as to indicate a drop in fluid temperature when normal fluid flow to the hollow member cavity is interrupted.

20 Claims, 2 Drawing Sheets

FLUID HEATED ROLL APPARATUS AND METHOD

BACKGROUND OF THE INVENTION

This invention relates to an apparatus and method which use a fluid heated roll. The invention is particularly applicable to fiber processing equipment such as fluid (i.e. steam) heated draw rolls. Such draw rolls are rotated at relative velocities so as to stretch fibers to thereby decrease their diameters. Heating such draw rolls particularly enhances the properties of the processed fibers and assists in preventing the fibers from breaking while being stretched over such draw rolls. The final processed fiber products are used to make yarns.

One difficult problem encountered in the art of fiber processing has been the early and accurate detection of a "cold", steam-heated roll (i.e. a draw roll whose steam supply is decreased or interrupted entirely). It is important to quickly detect such a cold roll so that the processing equipment can be shut down to minimize the production of resulting bad product.

One prior technique for detecting a cold roll involves detecting the temperature of the steam supply to the roll. Such a technique can give a false indication of a hot draw roll when steam is leaking from the apparatus downstream from the temperature detection location in the steam supply line but upstream from the draw roll.

Another prior technique for detecting a cold draw roll involves directly detecting the temperature of the draw roll exterior surface by contacting a hand-held pyrometer with the draw roll surface. This technique can give highly inaccurate temperature readings due to factors such as friction between the draw roll surface and pyrometer. Furthermore, if for any reason the norma) flow of steam to the draw roll is decreased or cut off entirely, the technique does not detect such a condition until the surface of the draw roll has actually cooled down. By that time, bad product will have already been produced.

SUMMARY OF THE INVENTION

It is, therefore, an objection of the invention to provide a fluid heated roll apparatus and method which is an improvement over the prior art in quickly and accurately detecting when the normal flow of a hot fluid to the roll is decreased or interrupted entirely.

The above object is realized by an apparatus which comprises: a hollow member, such as a roll, having a cavity defined therein; means for supplying a hot fluid to the cavity so as to heat the exterior surface of the hollow member; means for withdrawing fluid from the cavity, wherein such withdrawing means includes first conduit means for receiving fluid therethrough which is fixedly connected to the hollow member; means for rotating the hollow member, whereby the first conduit means rotates with the hollow member; and temperature detection means positioned within the first conduit means so as to detect at a temperature detection location within the first conduit means the temperature of fluid flowing therethrough.

According to another aspect of the invention, there is provided a method of using an apparatus as described above wherein a hot fluid is supplied to such a rotating hollow member and fluid is withdrawn through the first conduit means, and further wherein the temperature of the fluid in the first conduit means is detected at the above mentioned temperature detection location.

The invention accomplishes the immediate detection of a decrease or interruption in the normal flow of hot fluid to the rotating member (i.e. roll) by detecting the temperature of fluid being withdrawn from the hollow member. Detection of a cool fluid flowing in the rotating first conduit means, which in the description hereinafter is called a syphon conduit, indicates such a decrease or interruption of fluid supply to the hollow member due to, for example, leakage of fluid at any point in the fluid supply system. Furthermore, the invention detects a decrease or interruption of fluid to the hollow member before the hollow member, typically made of a heat retaining metal such as steel, has a chance to cool down. Thus, in the environment of a fiber processing system using a fluid heated draw roll, the system can be shut down or the problem corrected before an appreciable amount of bad product is produced, thus minimizing waste and enhancing production efficiency.

DETAILED DESCRIPTION OF THE INVENTION

An embodiment of the invention will now be described with reference to the FIGURES. Although the embodiment described is in the environment of a fiber processing system, it should be understood that the invention, according to certain broad aspects thereof, is applicable to any situation in which detection of a cold rotating roll is desirable. For example, the invention could be used in conjunction with a fluid heated calender roll in a paper processing apparatus.

Figure 1:
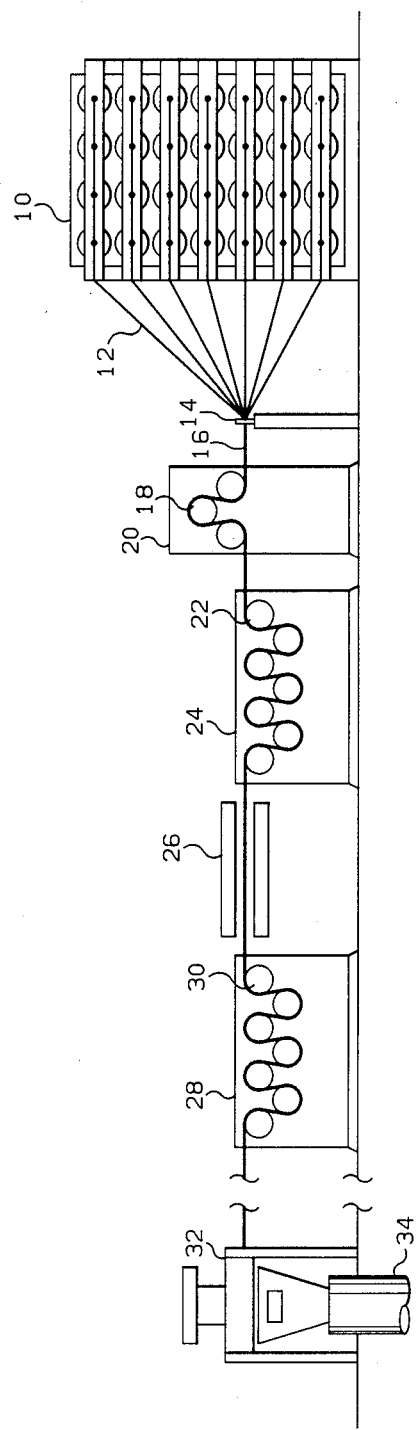
FIG. 1 is a schematic of a fiber processing system which can use draw rolls constructed in accordance with the invention.

Referring now to FIG. 1, several important components of a fiber processing system are schematically illustrated. The illustrated system includes a creel 10 which includes a number of packages, or spools, of fibers. The fibers were previously extruded from a spinerette onto the packages or spools. A plurality of fibers as indicated at 12 are withdrawn from the creel 10 so as to be received through a converging stand 14. The plurality of fibers are converged into a tow, indicated at 16, which is a loose, essentially untwisted bundle of fibers. As an alternative to the illustrated arrangement, it is possible to feed fibers 12 into converging stand 14 directly from the outlet of a spinerette or groups of spinerettes.

Tow 16 is then passed around a set of rolls 18 in a pretension stand 20. Rolls 18 are rotated at a rotational velocity only slightly (i.e. about 1%) less than the velocity of draw rolls 22 of draw roll stand 24. Rolls 18 of pretension stand 20 therefore function to simply pull undesirable loops and twists out of tow 16. Tow 16 is accordingly passed around the exterior surface of each of draw rolls 22, which in the illustrated embodiment are arranged in a serpentine fashion Tow 16 is passed from the last roll of draw stand 24 through an electric heater 26 to maintain the desired temperature of tow 16 between draw stand 24 and second draw stand 28. Draw stand 28 includes a plurality of draw rolls 30 which are rotated at a velocity greater than the velocity of each of rolls 22 of draw stand 24. The draw ratio between the two draw stands, which can be defined as the ratio of the velocity of each roll 30 to the velocity of each roll 22, is preferably about 3.0 to about 3.5.

After draw stand 28, the tow 16 can be processed through additional equipment which is not shown, such as additional draw stands, if desired, and equipment for crimping and/or finishing the tow 16.

Finally, tow 16 is received by tow cutter 32 which cuts the tow into a plurality of staple fiber bundles which are conveyed through a suitable conduit 34 to a baler, not shown. Alternatively, tow 16 could be simply wound onto a spool in a continuous fiber process.

Figure 2:
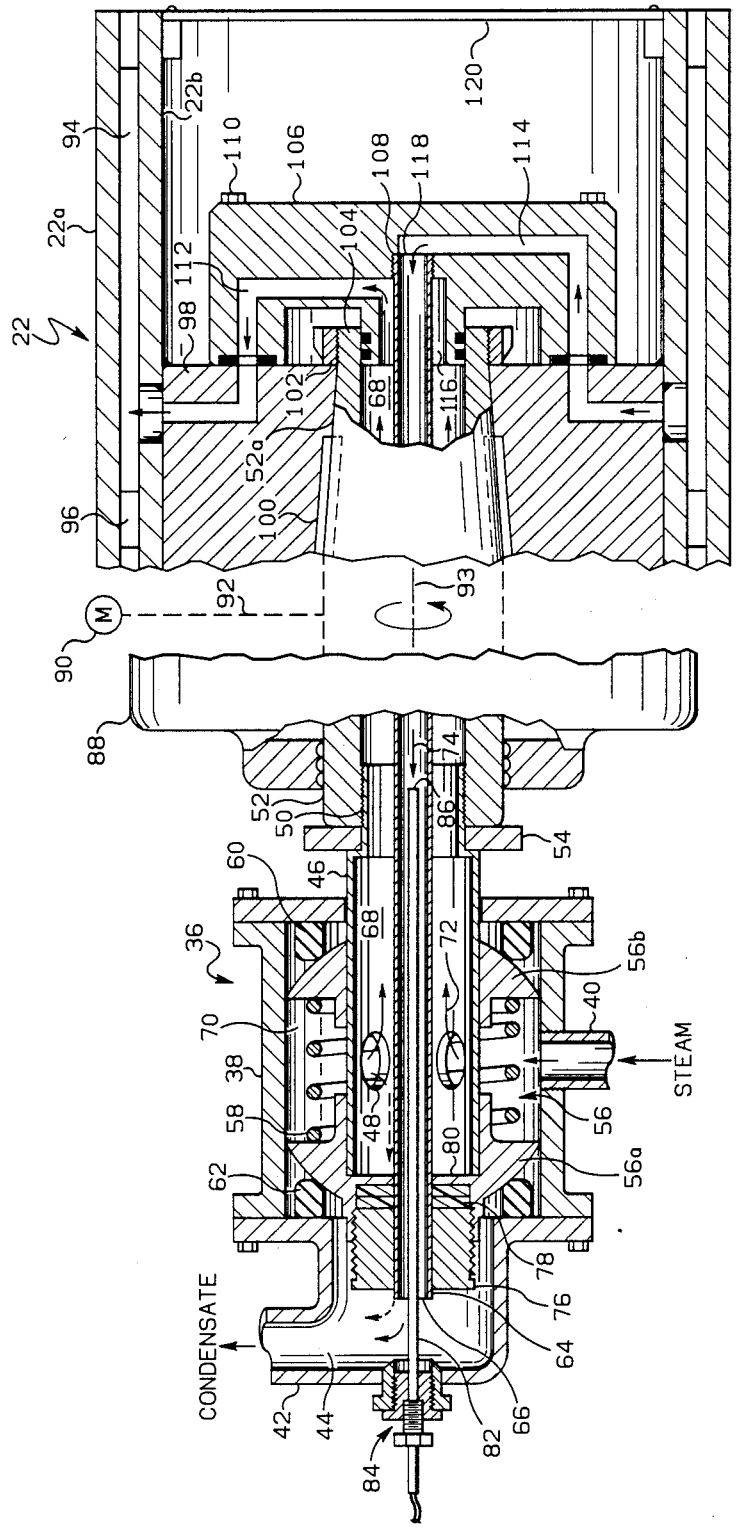
FIG. 2 is a partial cross sectional view of an embodiment of an apparatus in accordance with the invention. It should be noted that elements shown in FIG. 2 are not necessarily drawn to scale and certain conventional details (such as lock washers) have been omitted for ease of illustration.

Referring now to FIG. 2, there is shown an apparatus for steam heating one of rolls 22 and for withdrawing condensed steam, or condensate, from roll 22. Such an apparatus can be applied to each of rolls 22 and also each of rolls 30.

The apparatus of FIG. 2 includes a rotary joint 36. Rotary joint 36 includes a housing 38, preferably of metallic construction, which has associated therewith a steam inlet conduit 40 and a condensate outlet conduit 42. Condensate outlet conduit 42 has a passageway 44 defined therethrough. Housing 38 is preferably secured by a suitable means (not shown) to a stationary structure such that housing 38 and associated inlet and outlet conduits are prevented from rotating during the operation of the rotary joint so as to remain stationary.

Rotary joint 36 further includes a conduit section 46 which will hereinafter be referred to as a nipple. Nipple 46 has a plurality of circumferentially spaced inlets 48 and a threaded end 50 which is received within one end of another conduit section 52, which will be discussed further below. A locking ring 54 is situated between an enlarged portion of nipple 46 and the end of conduit section 52 so as to prevent unscrewing of nipple 46 from conduit section 52.

A thrust collar 56 is positioned within housing 38 and is keyed, by means not shown, to nipple 46 so as to prevent rotation of thrust collar 56 with respect to nipple 46. Thrust collar 56 includes two generally hemispherically shaped thrust collar halves 56a and 56b which are slidably received within housing 38. A spring 58 extends between the inner faces of thrust collar halves 56a and 56b so as to urge the thrust collar halves apart and in sealing engagement with generally annular graphite-carbon seals 60 and 62. Spring 58 is for initial seating only, whereas the rotary joint is pressured sealed by steam therein while in operation.

A syphon conduit 64, having an outlet 66 in direct communication with passageway 44, extends through nipple 46 so as to be generally coaxial therewith. A generally annular passageway 68 is defined between the exterior surface of syphon conduit 64 and the interior surface of nipple 46. Generally annular passageway 68 continues through conduit section 52 so as to be defined between the exterior surface of syphon conduit 64 and the interior surface of conduit section 52. Annular passageway 68 communicates with inlets 48 such that steam which passes into the steam chamber 70 defined within housing 38 flows through inlets 48 and into annular passageway 68 in the direction indicated at 72. Syphon conduit 64 is adapted to receive therethrough a flow of condensate in the direction indicated at 74, which is opposite to the direction 72 of steam flowing through annular passageway 68.

A packing gland 76 is threadedly received within one end of thrust collar half 56a so as to urge packing rings 78 against an annular protrusion 80 which radially extends from thrust collar half 56a. Packing rings 78, which are positioned between annular passageway 68 and passageway 44, sealingly engage the exterior surface of syphon conduit 64 so as to assist in preventing leakage of steam from annular passageway 68 into passageway 44. Packing rings 78 can be made of any suitable material which effects a gas-tight seal, such as graphite coated Teflon ®.

In operation, therefore, thrust collar 56, nipple 46, conduit section 52 and packing gland 76 and associated packing rings 78 all rotate as a single unit. As will become apparent from discussion below, syphon conduit 64 also rotates.

A thermocouple 82 is provided so as to extend through the sidewall of condensate outlet conduit 42 by means of a threaded tap and associated compression fitting as generally indicated at 84. Thus, thermocouple 82 is stationary. As shown, thermocouple 82 extends to a tip which occupies a temperature detection location 86 within syphon conduit 64. The type of thermocouple in the illustrated embodiment is the type which includes two wires of dissimilar composition which connect at the tip of the thermocouple. Temperature is detected at this location. A suitable commercially available thermocouple is an I-C type thermocouple such as catalog No. 223-J-10-24-89 available from Thermal Corp. of Madison, Ala.

Temperature detection location 86, inlets 48 and syphon conduit outlet 66 are preferably relatively positioned such that outlet 66 is downstream from temperature detection location 86 and inlets 48 are positioned between outlet 66 and temperature location 86. Such relative positioning is particularly advantageous in view of the fact that packing rings 78 are susceptible to occasional leakage as a result of routine wear and tear. Such leakage can result in the undesirable flow of steam from inlets 48, through packing rings 78 and out into passageway 44 as indicated by the dashed arrows. In the case of such leakage, the steam will typically follow this flow path as the path of least resistance instead of the desired flow path in the opposite direction. Since the temperature detection location 86 is well beyond inlets 48 in the illustrated embodiment, this will avoid any possibility that leaking steam flowing around syphon conduit 64 might elevate the temperature at location 86 to the point where thermocouple 82 would produce a misleading reading. When steam leaks through packing rings 78 as indicated, thermocouple 84 will give a clear reading of a cold condensate flow within syphon conduit 64, thus indicating interruption of or a significant decrease in the flow of steam to roll 22.

Conduit section 52 extends through a bearing assembly 88, only a portion of which is shown, in which it is suitably mounted to rotate in contact with roller bearings (not shown). Another bearing assembly can be provided but is not shown for clarity of illustration.

An intermediate portion of conduit section 52 is schematically indicated by dashed lines between bearing assembly 88 and roll 22. Such an intermediate portion of conduit section 52 can be driven by a suitable drive motor 90 via a drive link as schematically indicated at 92. A suitable drive link might be, for example, a gear train adapted to mechanically rotate conduit section 52 and thus also roll 22 as will become apparent below. Drive motor 90 rotates conduit section 52 around a longitudinal rotational axis 93.

As shown, roll 22 includes an outer tubular member 22a and an inner tubular member 22b. A generally annular cavity 94 is defined between tubular member 22a and 22b. Braces 96 are mounted between tubular members 22a and 22b so as to be spaced along annular cavity 94.

A roll core 98 is fixedly connected to inner tubular 22b by suitable welds. A tapered end portion of conduit section 52, as indicated at 52a, is fixedly connected to roll core 98 by means of keys 100, which fit within slots cut along the inner surface of core 98 and the outer surface of conduit section end portion 52a, and by means of a lock nut 102 which is threadedly received on outlet end 104 of conduit section 52. An end cap 106 is shown as being threadedly received on inlet end 108 of syphon conduit 64. End cap 106 is fixedly connected to roll core 98 by means of a plurality of bolts 110.

In view of the above, syphon conduit 64 is fixedly connected to roll 22 by means of roll core 98, and syphon conduit 64 is fixedly connected to roll 22 by means of end cap 106 and roll core 98. Therefore, conduit section 52, syphon conduit 64, and roll 22 rotate together as an integral unit.

Annular passageway 68 and syphon conduit 64 communicate with cavity 94 by means of respective passageways 112 and 114 which are defined by bored out sections of roll core 98 and end cap 106. Passageway 112 extends between cavity 94 and a generally annular outlet 116 of conduit section 52. Similarly, passageway 114 extends between cavity 94 and inlet 118 of syphon conduit 64 as defined by the inlet end 108. Finally, the end of roll 22 can be closed off by a plate 120 suitably connected to roll 22 by, for example, screws. Plate 120 is therefore easily removable in case any components within roll 22 are in need of repair or replacement.

Operation of the apparatus illustrated in FIG. 2 will now be described with reference to this FIGURE.

Steam is introduced through inlet conduit 40 so as to flow into steam chamber 70 defined within housing 38 of rotary joint 36. The steam accordingly flows through inlets 48 of nipple 46 and into annular passageway 68 in the direction indicated at 72. Such steam flow continues through annular passageway 68 so as to exit the annular passageway at outlet 116. Such steam then flows through passageway 112 and into annular cavity 94 so as to heat the exterior surface of roll 22.

Steam within cavity 94 soon thereafter condenses to condensate within cavity 94 which is forced into passageway 114 by steam pressure within cavity 94. The condensate accordingly flows through passageway 114 as indicated into syphon conduit inlet 118 and through the interior of syphon conduit 64 in the direction indicated at 74 which is opposite to direction 72. Thermocouple 82 detects the temperature of the condensate flowing within syphon conduit 64 at temperature detection location 86. The thermocouple 82 accordingly produces an electrical signal which is monitored by means of appropriate equipment to obtain a temperature reading. As indicated, the condensate then flows out of syphon conduit 64 through outlet 66 and into passageway 44 as defined by condensate outlet conduit 42.

In the case of normal flow of steam into and through annular passageway 68 and into cavity 94, condensate withdrawn from cavity 94 and passing through syphon conduit 64 is detected as being at a normal temperature, about 220° F. to about 280° F. where roll 22 is a draw roll. Steam flowing through annular passageway 68 is at an equilibrium temperature approximately the same as that temperature of the condensate so as to not adversely affect the temperature reading obtained with thermocouple 82. When leakage occurs in the steam supply line or through packing rings 78, the steam pressure as well as temperature in annular passageway 68 will drop dramatically. The temperature of condensate flowing through syphon conduit 64 will therefore also decrease, such decrease in temperature being detected by thermocouple 82 at temperature detection location 86. Such a detection of a drop of condensate temperature immediately follows a drop in pressure and consequent drop in temperature of steam supplied to annular passageway 68 and cavity 94, thereby enabling an operator of an apparatus as shown in FIG. 1 to shut down the apparatus before roll 22 has a chance to cool down significantly. Therefore, little or no bad product is produced when steam supply problems develop. As has been explained previously, positioning of the tip of thermocouple 82 as illustrated is particularly advantageous in instances where steam leakage occurs through packing rings 78.

Obviously many modifications and variations of the present invention are possible and light of the above teachings. For example, instead of using water as the heating fluid, wherein the fluid is supplied as a vapor to cavity 94 and withdrawn as a condensate from cavity 94, a heated fluid such as oil could be supplied to cavity 94 as a liquid and withdrawn from the cavity as a liquid. It is therefore to be understood thai within the scope of the appended claims the invention may be practiced otherwise than as specifically described.

That which is claimed is:

1. An apparatus comprising:
    a hollow member having a cavity defined therein and also having an exterior surface;
    means for supplying a hot fluid to said cavity so as to heat the exterior surface of said hollow member;
    means for withdrawing fluid from said cavity, said withdrawing means including a rotatable conduit means for receiving fluid therethrough which is fixedly connected to said hollow member;
    means for rotating said hollow member, whereby said rotatable conduit means rotates with said hollow member; and
    temperature detection means positioned within said rotatable conduit means so as to detect at a temperature detection location within said rotatable conduit means the temperature of fluid flowing therethrough.

2. An apparatus comprising:
    a hollow member having a cavity therein and also having an exterior surface;
    means for rotating said hollow member;
    means for supplying a hot fluid to said cavity so as to heat the exterior surface of said hollow member;
    means for withdrawing fluid from said cavity, said withdrawing means including a rotatable syphon conduit means, having an inlet and an outlet, which extends from said inlet within said hollow member to said outlet;
    fluid outlet conduit means having a passageway defined therethrough in direct fluid communication with said outlet;
    temperature detection means positioned within said rotatable syphon conduit means so as to detect at a temperature detection location within said rotatable syphon conduit means the temperature of fluid flowing therethrough.

3. An apparatus as recited in claim 2 wherein said rotatable syphon conduit means is fixedly connected to said hollow member so as to rotate with said hollow member, and wherein said fluid outlet conduit means is stationary.

4. An apparatus comprising:
a hollow member having a cavity defined therein and also having an exterior surface;
means for rotating said hollow member;
means for supplying a hot fluid to said cavity so as to heat the exterior surface of said hollow member, wherein said fluid supplying means includes a supply conduit means which is fixedly connected to said hollow member so as to rotate therewith and which has a supply conduit inlet and also a supply conduit outlet communicating with said cavity;
means for withdrawing fluid from said cavity, wherein said withdrawing means includes a rotatable syphon conduit means, having a rotatable syphon conduit inlet and a rotatable syphon conduit outlet, fixedly connected to said hollow member so as to rotate therewith and which extends through said supply conduit means from said rotatable syphon conduit inlet within said hollow member and in communication with said cavity to said rotatable syphon conduit outlet, a generally annular passageway being defined between said rotatable syphon conduit means and said supply conduit means which communicates with said supply conduit inlet and said supply conduit outlet and which receives fluid therethrough in a first direction opposite to flow of fluid through said rotatable syphon conduit means in a second direction;
a stationary fluid outlet conduit means having a passageway defined therethrough in direct communication with said rotatable syphon conduit outlet;
seal means between said generally annular passageway and said fluid outlet conduit means passageway so as to assist in preventing leakage of fluid from said generally annular passageway to said fluid outlet conduit means passageway; and
temperature detection means positioned within said rotatable syphon conduit means so as to detect at a temperature detection location within said rotatable syphon conduit means the temperature of fluid flowing therethrough.

5. An apparatus as recited in claim 4 wherein said rotatable syphon conduit outlet is downstream from said temperature detection location, said supply conduit inlet being positioned between said rotatable syphon conduit outlet and said temperature detection location in said rotatable syphon conduit means.

6. An apparatus as recited in claim 5 wherein said rotatable syphon conduit inlet is upstream from said temperature detection location and said supply conduit outlet communicates with said generally annular passageway downstream from said supply conduit inlet, said fluid supplying means further comprising a means for defining a passageway between said supply conduit outlet and said hollow member cavity and said fluid withdrawing means further comprising a means for defining a passageway between said hollow member cavity and said rotatable syphon conduit inlet.

7. An apparatus as recited in claim 6 further comprising a means for supplying a plurality of fibers to the exterior surface of said hollow member.

8. An apparatus as recited in claim 7 wherein said hollow member is a draw roll.

9. An apparatus as recited in claim 8 wherein fluid as supplied to said cavity by said fluid supplying means is a vapor and wherein fluid as withdrawn from said cavity by said fluid withdrawing means is a condensate.

10. An apparatus as recited in claim 9 wherein said fluid is water, said vapor is steam, and said condensate is condensed steam.

11. A method comprising:
providing a hollow member having a cavity defined therein and also having an exterior surface;
supplying a hot fluid to said cavity so as to heat the exterior surface of said hollow member;
withdrawing fluid from said cavity through a rotatable conduit means which is fixedly connected to said hollow member;
rotating said hollow member, whereby said rotatable conduit means rotates with said hollow member;
detecting the temperature of fluid at a temperature detection location within said rotatable conduit means.

12. A method comprising:
providing a hollow member having a cavity defined therein and also having an exterior surface;
rotating said hollow member;
supplying a hot fluid to said cavity so as to heat the exterior surface of said hollow member;
withdrawing fluid from said cavity through a rotatable syphon conduit means having an inlet and an outlet, said withdrawn fluid flowing through said inlet within said hollow member to said outlet;
flowing said withdrawn fluid from said outlet to and through a passageway defined within a fluid outlet conduit means in direct fluid communication with said outlet;
detecting the temperature of said withdrawn fluid at a temperature detection location within said rotatable syphon conduit means.

13. A method as recited in claim 12 wherein said rotatable syphon conduit means is fixedly connected to said hollow member so that in said rotating step said rotatable syphon conduit means rotates with said hollow member, and further wherein said fluid outlet conduit means is stationary.

14. A method comprising:
providing a hollow member having a cavity defined therein and also having an exterior surface;
rotating said hollow member;
supplying a hot fluid to said cavity so as to heat the exterior surface of said hollow member, said fluid being supplied to said cavity by a supply conduit means which is fixedly connected to said hollow member so as to rotate therewith and which has a supply conduit inlet and also a supply conduit outlet communicating with said cavity;
withdrawing fluid from said cavity through a rotatable syphon conduit, having a rotatable syphon conduit inlet and a rotatable syphon conduit outlet, fixedly connected to said hollow member so as to rotate therewith and which extends through said supply conduit means from said rotatable syphon conduit inlet within said hollow member and in communication with said cavity to said rotatable syphon conduit outlet, a generally annular passageway being defined between said rotatable syphon conduit means and said supply conduit means which communicates with said supply conduit inlet and said supply conduit outlet and which receives fluid therethrough in a first direction opposite to flow of fluid through said rotatable syphon conduit means in a second direction;

flowing fluid from said syphon conduit outlet to and through a passageway, in direct communication with said rotatable syphon conduit outlet, which is defined by a stationary fluid outlet conduit means;

providing a seal means between said generally annular passageway and said fluid outlet conduit means passageway so as to assist in preventing leakage of fluid from said generally annular passageway to said fluid outlet conduit means passageway; and detecting the temperature of fluid at a temperature detection location within said rotatable syphon conduit means.

15. A method as recited in claim 14 wherein said rotatable syphon conduit outlet is downstream from said temperature detection location, and wherein said temperature detection location is positioned such that said supply conduit inlet is positioned between said rotatable syphon conduit outlet and said temperature detection location.

16. A method as recited in claim 15 wherein said rotatable syphon conduit inlet is upstream from said temperature detection location and said supply conduit outlet communicates with said generally annular passageway downstream from said supply conduit inlet, and wherein said fluid supplying step further comprises flowing fluid through a passageway from said supply conduit outlet to said cavity and said fluid withdrawing step further comprises flowing fluid through a passageway from said cavity to said rotatable syphon conduit inlet.

17. A method as recited in claim 16 further comprising supplying a plurality of fibers to the exterior surface of said hollow member.

18. A method as recited in claim 17 wherein said hollow member is a draw roll.

19. A method as recited in claim 18 wherein said fluid is supplied to said cavity as a vapor and wherein said fluid is withdrawn from said cavity as a condensate.

20. A method as recited in claim 19 wherein said fluid is water, said vapor is steam, and said condensate is condensed steam.

* * * * *